United States Patent
Nick et al.

(10) Patent No.: US 6,808,217 B2
(45) Date of Patent: Oct. 26, 2004

(54) LOADING FLOOR FOR A VEHICLE WITH SPACING ELEMENT AND LOADING APPARATUS

(75) Inventors: Albrecht Nick, Isenbüttel (DE); Wulf Thoma, Gifhorn (DE)

(73) Assignee: Sai Automotive Sal GmbH, Hagenbach (DE)

( * ) Notice: Subject to any disclaimer, the term of this patent is extended or adjusted under 35 U.S.C. 154(b) by 0 days.

(21) Appl. No.: 10/721,777

(22) Filed: Nov. 24, 2003

(65) Prior Publication Data

US 2004/0160073 A1 Aug. 19, 2004

Related U.S. Application Data

(63) Continuation of application No. PCT/EP03/05364, filed on May 22, 2003.

(30) Foreign Application Priority Data

May 22, 2002 (DE) .......................................... 102 23 042

(51) Int. Cl.$^7$ ............................................. B62D 33/02
(52) U.S. Cl. ............................... 296/26.08; 296/26.09; 296/39.2
(58) Field of Search .......................... 296/26.08, 26.09, 296/37.6, 39.2, 184.1; 224/281, 542, 496

(56) References Cited

U.S. PATENT DOCUMENTS

| | | | | |
|---|---|---|---|---|
| 2,852,303 A | * | 9/1958 | Hopson | ................... 296/26.09 |
| 4,950,123 A | * | 8/1990 | Brockhaus | ................... 414/522 |
| 5,938,262 A | * | 8/1999 | Mills | ........................ 296/26.09 |
| 6,015,177 A | * | 1/2000 | Tijerina | ..................... 296/37.6 |
| 6,065,792 A | * | 5/2000 | Sciullo et al. | ........... 296/26.09 |
| 6,244,646 B1 | * | 6/2001 | Wheeler, III | ............ 296/26.01 |
| 6,328,364 B1 | * | 12/2001 | Darbishire | ............... 296/26.09 |
| 6,398,283 B1 | * | 6/2002 | Knudtson et al. | ........ 296/26.09 |
| 6,464,274 B2 | * | 10/2002 | Mink et al. | .............. 296/26.09 |
| 6,516,983 B2 | * | 2/2003 | Sotiroff et al. | .............. 224/281 |
| 6,705,656 B2 | * | 3/2004 | Keller | ..................... 296/26.09 |
| 2001/0033085 A1 | | 10/2001 | Bienert et al. | |
| 2001/0036396 A1 | | 11/2001 | Haid et al. | |

FOREIGN PATENT DOCUMENTS

| | | |
|---|---|---|
| DE | 197 49 158 | 5/1998 |
| DE | 197 31 324 | 3/1999 |

* cited by examiner

Primary Examiner—D. Glenn Dayoan
Assistant Examiner—Greg Blankenship
(74) Attorney, Agent, or Firm—Martin Fleit; Paul D. Bianco; Fleit, Kain, Gibbons, Gutman, Bongini & Bianco

(57) ABSTRACT

A loading apparatus for a vehicle, with a loading floor provisioned in a loading area of the vehicle, where the loading floor exhibits a spacing element, with guide linkage or channel, where the lower end of the spacing element is configured for engaging the guide linkage. The vehicle has a loading edge, where loading edge exhibits a slant for supporting the loading floor at a second end region.

12 Claims, 6 Drawing Sheets

LOADING FLOOR FOR A VEHICLE WITH SPACING ELEMENT AND LOADING APPARATUS

RELATED APPLICATION

This application is a continuation of International Application No. PCT/EP03/05364 filed May 22, 2003, the contents of which are here incorporated by reference in their entirety.

BACKGROUND OF THE INVENTION

1. Field of the Invention

The invention concerns a loading floor for a vehicle with spacing element and loading apparatus for a vehicle according to the teachings of the detailed description of the invention that follows

2. Prior Art

Various pull-out loading floors and loading apparatuses are known from the state of the art. A pull-out loading surface for station wagons is known from DE-OS 23 972, wherein guide rails are provisioned on the loading surface of the vehicle. The pull-out loading surface is mounted on these guide rails and can be moved on the guide rails on rollers. The items to be loaded can then be set onto the extended loading surface and pushed into the loading area of the vehicle.

A loading apparatus for personal vehicles or transportation vehicles is known from DE 296 08 955 U1. This loading apparatus consists of a guide element that is mounted on the floor of the loading area of the vehicle. A movable loading plate is located on the guide element and can be moved from a transportation position inside the loading area into a loading or unloading position, in which the loading plate is located outside of the vehicle, behind the rear of the vehicle.

A loading apparatus on an automobile with a swinging rear hatch is known from DE 196 19 126 A1. Fastened guide rails that run along the length of the vehicle are provisioned on both sides of the floor of the rear loading area, which can be closed by the rear hatch of the vehicle, Loading requires that the rear hatch is moved to the back into a horizontal loading position along a lower axis that runs traverse to the vehicle.

A loading floor for the loading area of a vehicle is known from DE 197 49 158 C2. The loading floor is mounted on rollers so that it can be moved, and can be partially pulled out of the loading area approximately parallel to the vehicle. The loading floor exhibits a crumple zone, provisioned traverse to the length of the car, in order to improve crash behavior.

A pull-out loading floor for a vehicle is known from DE 197 31 324 A1, which can be moved by means of rollers along support rails. The support rails are connected to the vehicle body such that their height can be adjusted. The height adjustment occurs by means of two parallelogram steering devices, with the help of an adjustment cylinder.

A further loading floor is known from U.S. Pat. No. 3,132,755, which can be pulled out of the loading area on guide rails approximately parallel to the vehicle floor. Further state of the art is know from DE 100 54 572 A1, DE 198 15 466 A1, DE 196 06 196 A1 and DE 298 10 132 U.

Pull-out loading floors and loading apparatuses of the type mentioned allow for simplified loading and unloading of the vehicle by setting the freight on the rolling loading floor. A load placed onto the extended loading floor can be pushed, along with the loading floor, into the interior of the vehicle without requiring much force. However, a common disadvantage of the previously known loading floors and loading apparatuses is that, due to the pull-out mechanism for the loading floor, a considerable amount of loading area is lost. A further disadvantage is the construction costs required for such known loading floors and loading apparatuses.

SUMMARY OF THE INVENTION

The object of the invention is, therefore, to provide an improved loading apparatus for a vehicle that overcomes the disadvantages of the prior art and provides the advantages set forth below.

The task of the invention is fulfilled by the characteristics of the specific embodiments disclosed herein and the teachings thereof as expressed in the appended claims.

A particular advantage of the invention is that the usable loading area is only decreased minimally by the loading floor and the corresponding loading apparatus. A further advantage is that a loading apparatus, according to the invention, can be realized with only a small number of construction elements. Such an apparatus can therefore be produced inexpensively and is simultaneously especially reliable.

According to a preferred embodiment of the invention, the loading floor is carried by a spacing element, the lower end of which engages a guide linkage, located on the side of the loading floor across from the rear bench of the vehicle. At its other end the loading floor is supported by a loading edge, which is angled into the loading area. In order to pull or extend the loading floor out of the loading area, the lower end of the spacing element moves through the guide linkage in the pull-out or extension direction, while the other end of the loading floor moves upwards along the slant of the loading edge.

The first section of the guide linkage runs parallel to the diagonal of the loading edge, and the second section that runs horizontally. In order to pull out the loading floor, the lower end of the spacing element is first moved along the first diagonal, upwards running section of the guide linkage, while the other end of the loading floor travels a parallel path along the slant of the loading edge. The length of the first section of the guide linkage is provisioned such that, as soon as the lower end of the spacing element has arrived at the end of the first section of the guide linkage, the end part of the loading floor has reached the upper end of the loading edge. Therefore the loading floor is raised in a diagonal motion and is simultaneously moved a stretch in the pull-out or extension direction. It is preferable that the loading floor remains horizontal, that is, parallel to the floor of the vehicle.

After this diagonal upward motion, the lower end of the spacing element moves along the second section of the guide linkage, which runs horizontally. In this process, the lower side of the loading floor slides over the loading edge, so that the loading floor is moved out of the loading area in a horizontal position.

According to a further preferred embodiment form of the invention, an arm is provisioned on both sides of the loading floor. A guide rod, which engages the guide linkage in the sidewalls of the loading area, is fastened to the lower ends of these arms. This provides a spacing element for carrying the loading floor.

According to a further preferred embodiment form of the invention, the guide linkage is configured as a U-profile, preferably a brass U-profile.

According to a further preferred embodiment form of the invention, roll or slide elements are provisioned on the lower end of the spacing element for engaging the guide linkage. These roll or slide elements can also simultaneously serve to provide power operation. For example, rollers can be added to the lower end of the spacing element that are, for example, driven by a gearwheel that engages a rack in the first section of the guide linkage.

According to a further preferred embodiment form of the invention, the drive mechanism is provisioned on the underside of the loading floor. Alternatively, the drive mechanism is provisioned under the loading edge. The drive can be mechanical, electrical, pneumatic or hydraulic.

According to a further preferred embodiment form of the invention, the drive force is transferred from the drive mechanism to the lower end of the spacing element by means of a transitory device. This can, for example, be a cord that is fastened to the lower end of the spacing element, and which runs along the guide linkage. This is preferably an endless cord (belt) that runs back to the drive mechanism, which is located under the loading edge, through the vehicle floor. By changing the drive direction the loading floor can be moved out as well as in.

According to a further preferred embodiment form, a cable is used as the transitory element. This is preferably a pressure-resilient cable so that pressure for moving the loading floor inwards is transferred to the lower end of the spacing element.

According to a further preferred embodiment form, a belt, for example a V-belt, toothed belt or a chain, is used as the transitory element.

According to a further preferred embodiment form of the invention, guide elements are located on the end region of the loading floor and/or on the load edge, which serve to move the loading floor in or out along the slant of the loading edge. For this purpose the slant of the loading edge has one or multiple recesses, which are engaged by corresponding elements on the face of the loading floor.

According to a further preferred embodiment form of the invention, roll or slide elements are provisioned on the face of the loading floor and/or on the slant of the loading edge in order to facilitate the movement of the loading floor along the slant and to reduce the resultant friction.

According to a further preferred embodiment form of the invention, roll or slide elements are provisioned on the upper side of the loading edge in order to facilitate the horizontal movement of the loading floor out of the loading area of the vehicle by reducing the resultant friction between the lower side of the loading floor and the upper side of the loading edge.

According to a further preferred embodiment form of the invention, roll or slide elements are provisioned on the side walls of the loading area in order to guide the outward or inward movement of the loading floor, and in particular to prevent that the loading floor becomes skewed as it moves. For this purpose, spring-loaded slide parts, for example, are provisioned on the sidewalls along the path of the loading floor when it is moved in or out.

BRIEF DESCRIPTION OF THE DRAWINGS

Further, preferred embodiment forms of the invention will be explained in detail in conjunction with the appended drawings in which.

DETAILED DESCRIPTION OF PREFERRED EMBODIMENTS OF THE INVENTION

Figure 1:
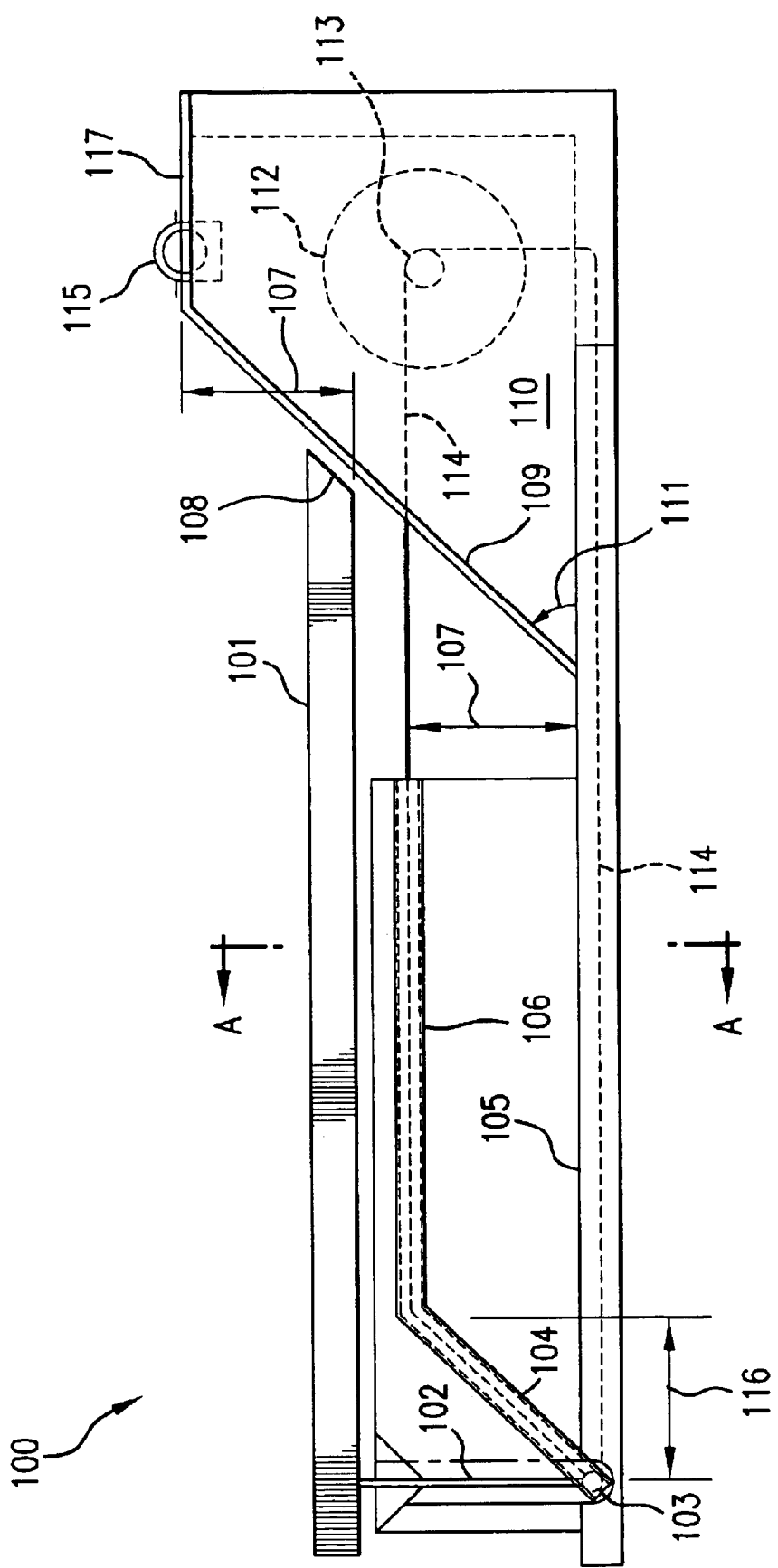
FIG. 1 shows a side-view of the loading area of a vehicle fitted with a preferred embodiment of a loading apparatus according to the invention.

FIG. 1 shows loading apparatus 100, which is provisioned or mounted in the loading area of a vehicle. The automobile is preferably an automobile with a rear hatch.

Loading apparatus 100 has loading floor 101, which can be moved out of the loading area. At its end, across from the rear seats of the vehicle, loading floor 101 has spacing element 102. Spacing element 102 engages first section 104 of a guide linkage or guide channel, which is provisioned or mounted in the sidewall of the loading area, with its end region 103. Section 104 of the guide linkage or channel stretches from vehicle floor 105 diagonally upwards toward the back of the vehicle.

Horizontally running section 106 of the guide linkage or channel connects to section 104 of the guide linkage. Section 104 of the guide linkage serves to lift loading floor 101 distance 107 from vehicle floor 105.

Loading floor 101 has face 108 on its other end, which is slanted. In the retracted state of loading floor 101, face 108 lies against slant 109 of loading edge 110.

Slant 109 forms acute angle 111 with the vehicle floor 105. Angle 111 is preferably between 25° and 45°, and preferably 30° in particular.

Drive mechanism 112 is located under loading edge 110. Drive mechanism 112 can be an electric drive, for example. Cord 114 lies along the guide linkage, that is, it is guided along sections 104 and 106 and is connected with end region 103 of spacing element 102.

Further, one or multiple slide ball 115 is located on upper side 117 of loading edge 110, which serves to facilitate the horizontal outward or inward movement of loading floor 101. Other slide elements, like slide rollers for example, can be provisioned alternatively or in addition.

Drive mechanism 112 is engaged to move loading floor 101 outwards, so that a pulling force is exerted on cord 114 by cord winch 113. This pulling force is transferred to end region 103 of spacing element 102 through cord 114.

Due to this pulling force, end region 103 of spacing element 102 is pulled into section 104 of the guide linkage. Face 108 of loading floor 101 simultaneously moves upward on slant 109.

When end region 103 has reached the end of section 104, loading floor 101 has been raised vertical distance 107 and has simultaneously moved horizontal distance 116 in the outwards direction.

In this position the lower side of loading floor 101 is at the same elevation as upper side 117 of loading edge 110. End region 103 is positioned at the transition from section 104 to section 106.

End region 103 is further moved through section 106 of the guide linkage due to the pulling force exerted through cord 114, so that loading floor 101 is moved horizontally out of the loading area of the vehicle. In the process, the underside of loading floor 101 runs over slide ball 115.

Loading floor 101 can then be conveniently loaded in the pulled-out position. After loading, loading floor 101 can then be moved back into the loading area together with the load on it, using manual force for example. This requires no great effort, since end region 103 moves back into its retracted position due to the force of gravity exerted along section 104 of the guide linkage.

Alternatively, cord 114 can be configured as an endless cord (belt), that is, cord 114 is looped back to cord winch 113, for example in the region of vehicle floor 105 as shown in FIG. 1 with a dashed line. In this case, the pulling-in movement of loading floor 101 also occurs automatically when drive mechanism 112 is driven in the opposite direction, so that the pulling force of the section of cord 114, shown by a dashed line, is now also exerted in the opposite, inward-moving direction. Due to this pulling force, end region 103 is first moved back into section 106 and then into section 104 of the guide linkage, into the inward position shown in FIG. 1.

A pressure-resilient cable can also be used instead of cord 114, as is also used for sliding roofs, for example. With the aid of the pressure-resilient cable, pressure can be exerted on section 104 in order to move loading floor 101 inwards.

It is preferable to provision a roll or slide bearing at end region 103. For example, a roller is provisioned at end region 103 that can move through sections 104 and 106 of the guide linkage. Additionally, drive elements can also be provisioned at end region 103, like a gearwheel, for example, which engages a rack, which is provisioned in section 104 of the guide linkage. With such an embodiment form it is preferable to provision the drive, which drives the gearwheel by means of a V-belt or toothed belt for example, on the lower side of loading floor 101. The gearwheel then runs over the rack in section 104 so that loading floor is lifted distance 107.

It is also preferable to provision roll or slide elements in the region of face 108. For example, slant 109 and/or face 108 are equipped with a slide coating, made of Teflon for example. This reduces the friction between face 108 and slant 109 during the lifting of loading floor 101 over distance 107.

Alternatively, or in addition, rollers are provisioned on face 108 and/or slant 109. Such a roller is preferably provisioned on face 108. This roll supports the loading floor on slant 109 and ensures that friction is reduced when lifting loading floor 101.

Further, recesses can be provisioned in slant 109 that engage the guide elements on face 108 and which run lengthwise along slant 109. When loading floor 101 is lifted, the guide elements are moved along the recesses in slant 109, so that the movement of loading floor 101 is precise and it cannot become skewed with the walls of the loading area. Guide elements can alternatively be provisioned on the sidewalls of the loading area to prevent that loading floor 101 becomes skewed. These can, for example, be spring-loaded sliders that are provisioned on the sidewalls of the loading area.

With regard to loading apparatus 100 from FIG. 1, it is especially advantageous that only a short distance 107 is required to lift loading floor, a few centimeters for example, so that practically none of the usable loading area is lost. In addition, only a small number of movable elements are required.

Figure 2:
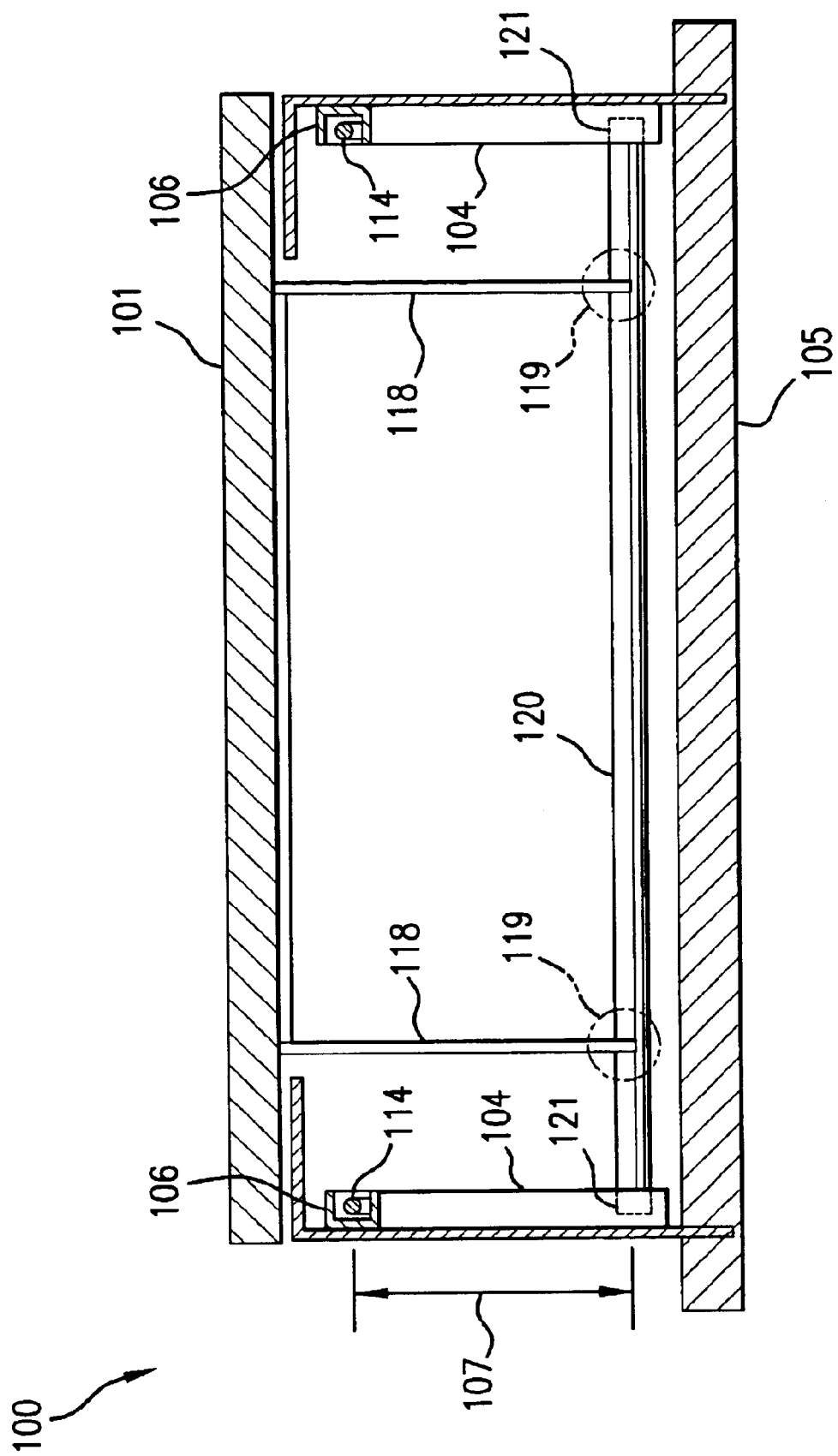
FIG. 2 shows a view of the loading area from FIG. 1 along line A—A.

FIG. 2 shows an embodiment of loading apparatus 100 from FIG. 1 along line A—A. With this embodiment, spacing element 102 is configured as two arms 118 that are connected to guide rod 120. Ends 121 of guide rod 120 extend into the guide linkage formed by sections 104 and 106.

In the position shown in FIG. 2, ends 121 are located near vehicle floor 105, at the beginning of sections 104 of the guide linkages provisioned on both side walls of the loading area. Ends 121 of guide rod 120 are connected to cord 114, through which a pulling-in or pushing-out force is exerted on guide rod 120 and thus loading floor 101.

Figure 3:
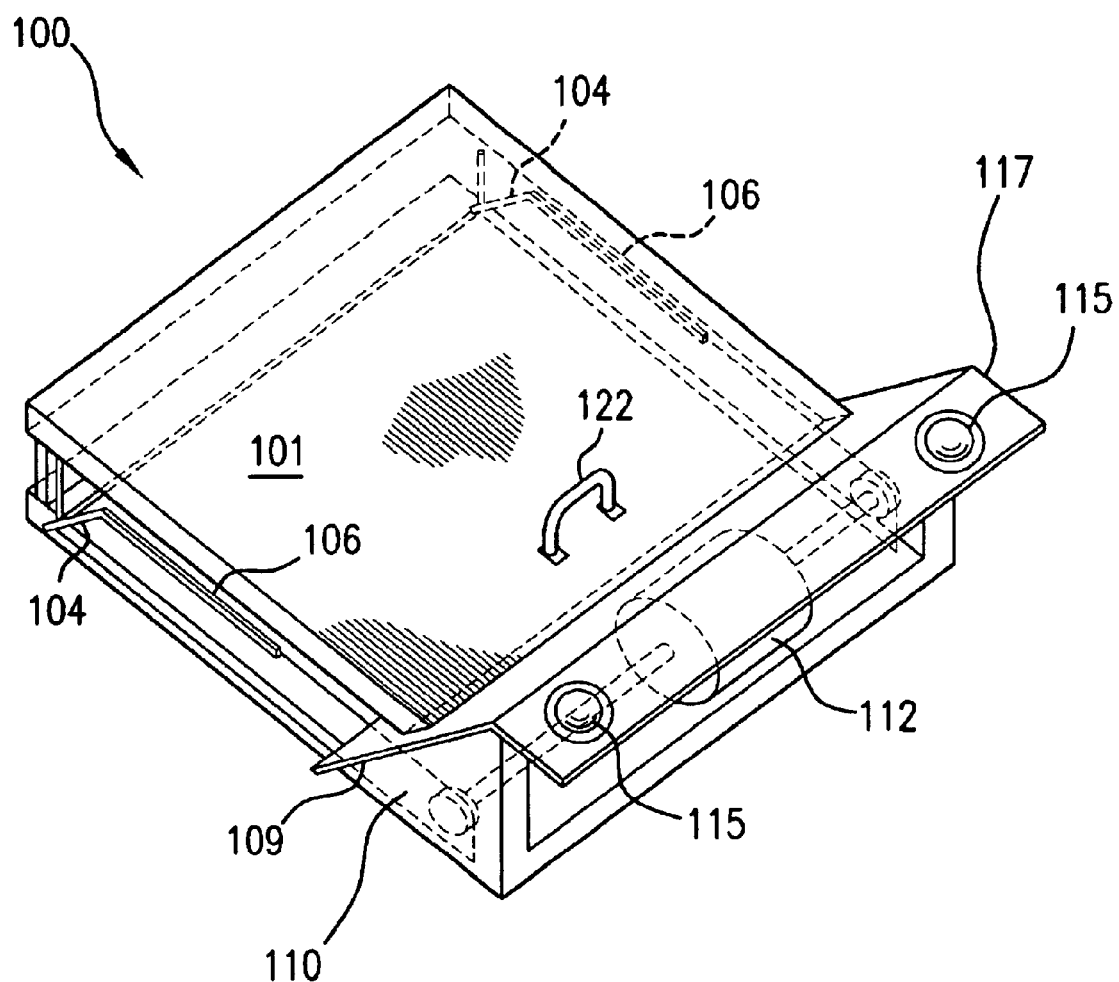
FIG. 3 shows a perspective view of the loading apparatus.

FIG. 3 shows a perspective view of loading apparatus 100. In the embodiment shown in FIG. 3, two slide balls 115 are located on upper side 117 of 110. In addition, grip 122 is located on loading floor 101 so that loading floor 101 can be operated manually.

Figure 4:
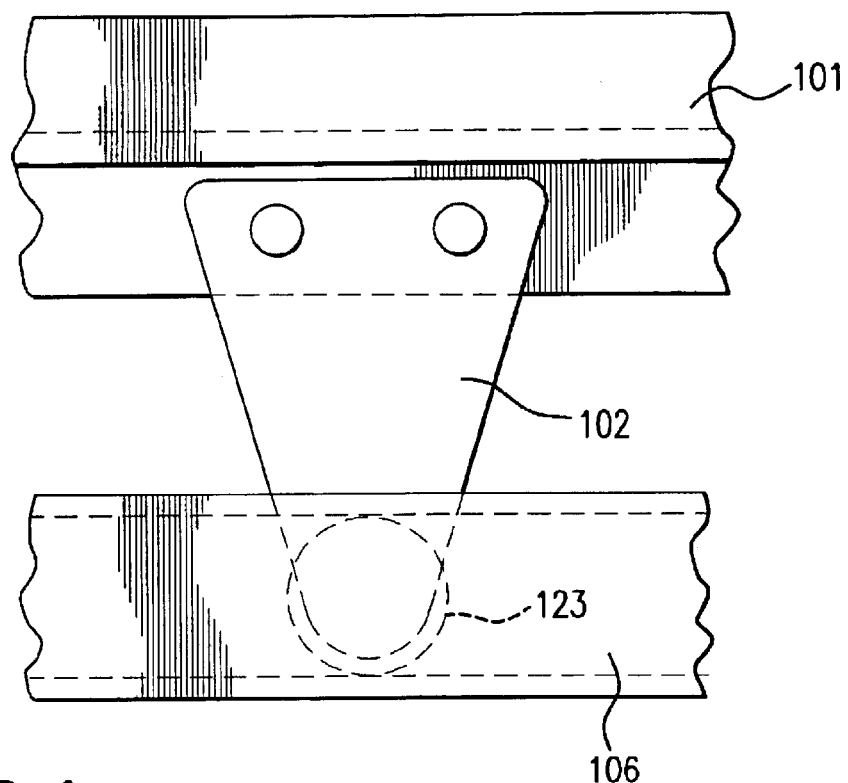
FIG. 4 shows a side-view of a further embodiment of a loading apparatus according to the invention.

FIG. 4 shows an alternative embodiment of the loading apparatus. Elements in FIG. 4 that correspond to elements in FIGS. 1 through 3 are designated with the same numbers.

With the embodiment shown in FIG. 4, spacing element 102 is configured as two steering devices 102, which are fastened to the sides of loading floor 101. One drive roller 123, which engages the guide linkage, is located on each steering device. The position shown in FIG. 4 is in section 106 of the guide linkage.

Figure 5:
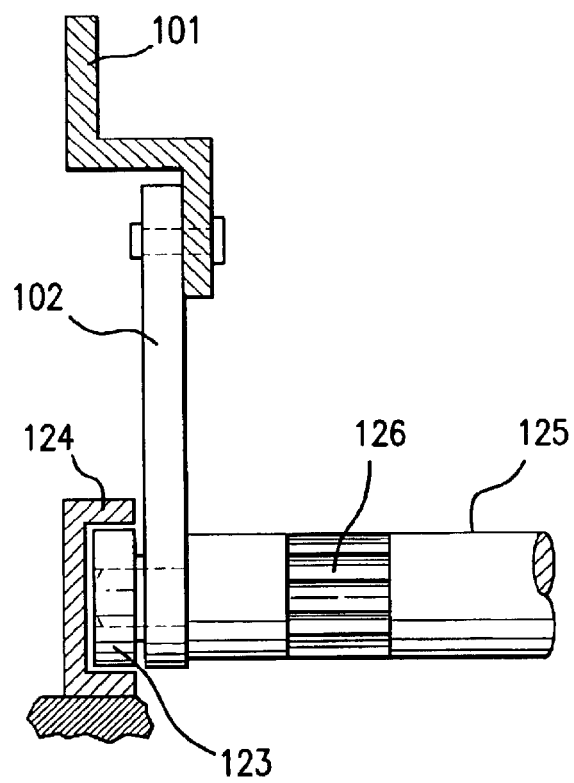
FIG. 5 shows a cross-sectional view of the loading apparatus from FIG. 4.

FIG. 5 shows a cross-sectional view of the embodiment from FIG. 4. With this embodiment, shaft 125 is held by the two steering devices, which make up spacing element 102 and lie across from one another on the sides of loading floor 101. On the ends of shaft 125 are rollers 123, which can move along U-profile 124, by which the guide linkage is formed. Gearwheel 126 sits on shaft 125 and serves to drive shaft 125 and thus rollers 123. Rollers 123 can also exhibit a gearwheel, which runs in U-profile 124 on a corresponding toothed profile, for transferring the drive force from rollers 123 to U-profile 124.

Figure 6:
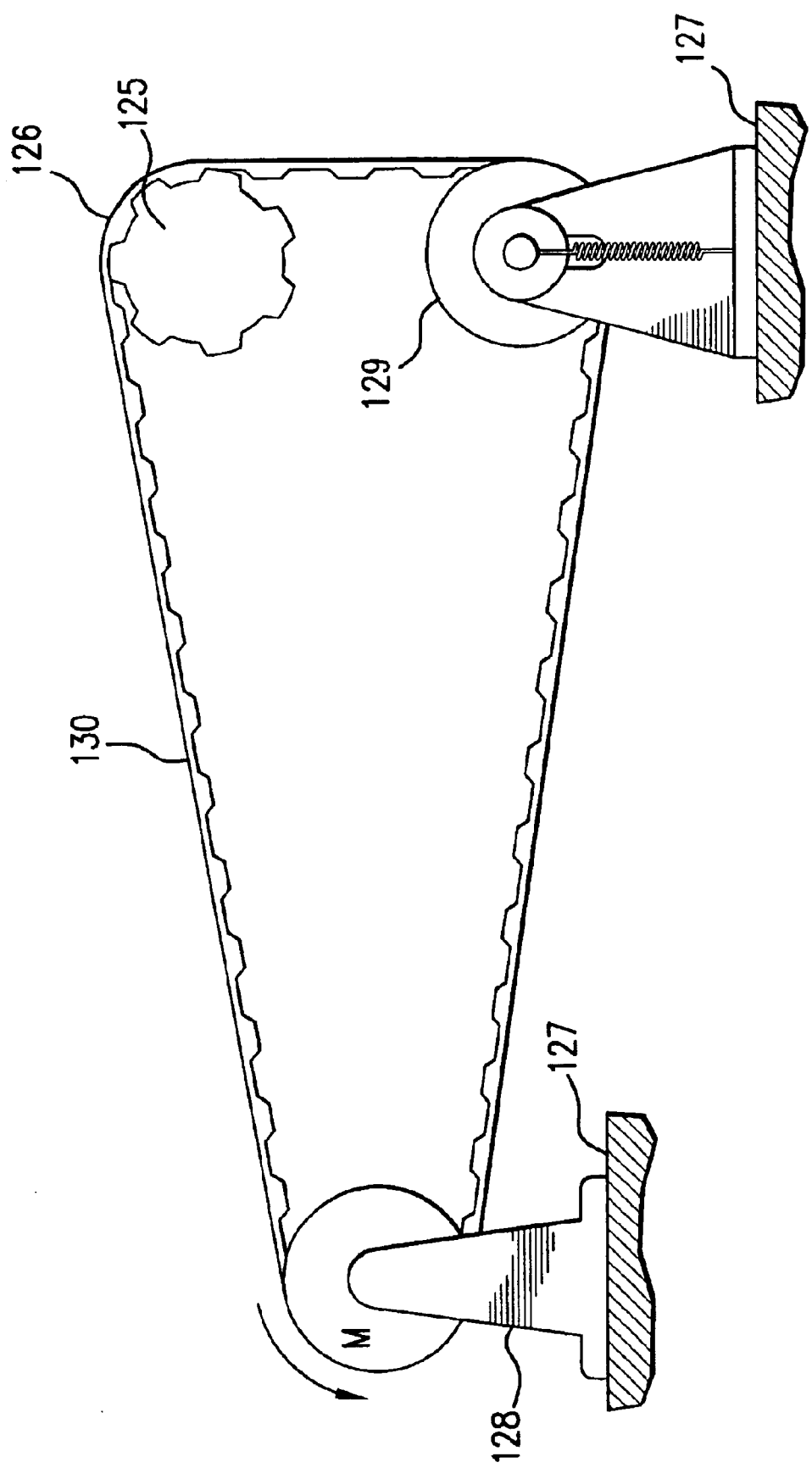
FIG. 6 shows an embodiment of a drive mechanism.

FIG. 6 shows an apparatus for driving shaft 125 (compare with FIG. 5). The apparatus consists of drive mechanism 128, fastened to body 127, and steering roller 129. Toothed belt 130 runs along drive mechanism 128, steering roller 129 and shaft 125, or gearwheel 126 situated on shaft 125, respectively. The drive force from drive 128 that is exerted on toothed belt 130 is transferred to shaft 125 such that rollers 123 are driven U-profile 124 so that loading floor 101 is moved in or out, according to the direction of the drive.

Steering roller 129 is preferably provisioned spring-loaded on body 127 so that toothed belt 130 is kept taught. A V-belt can also be used in place of a toothed belt.

Figure 7:
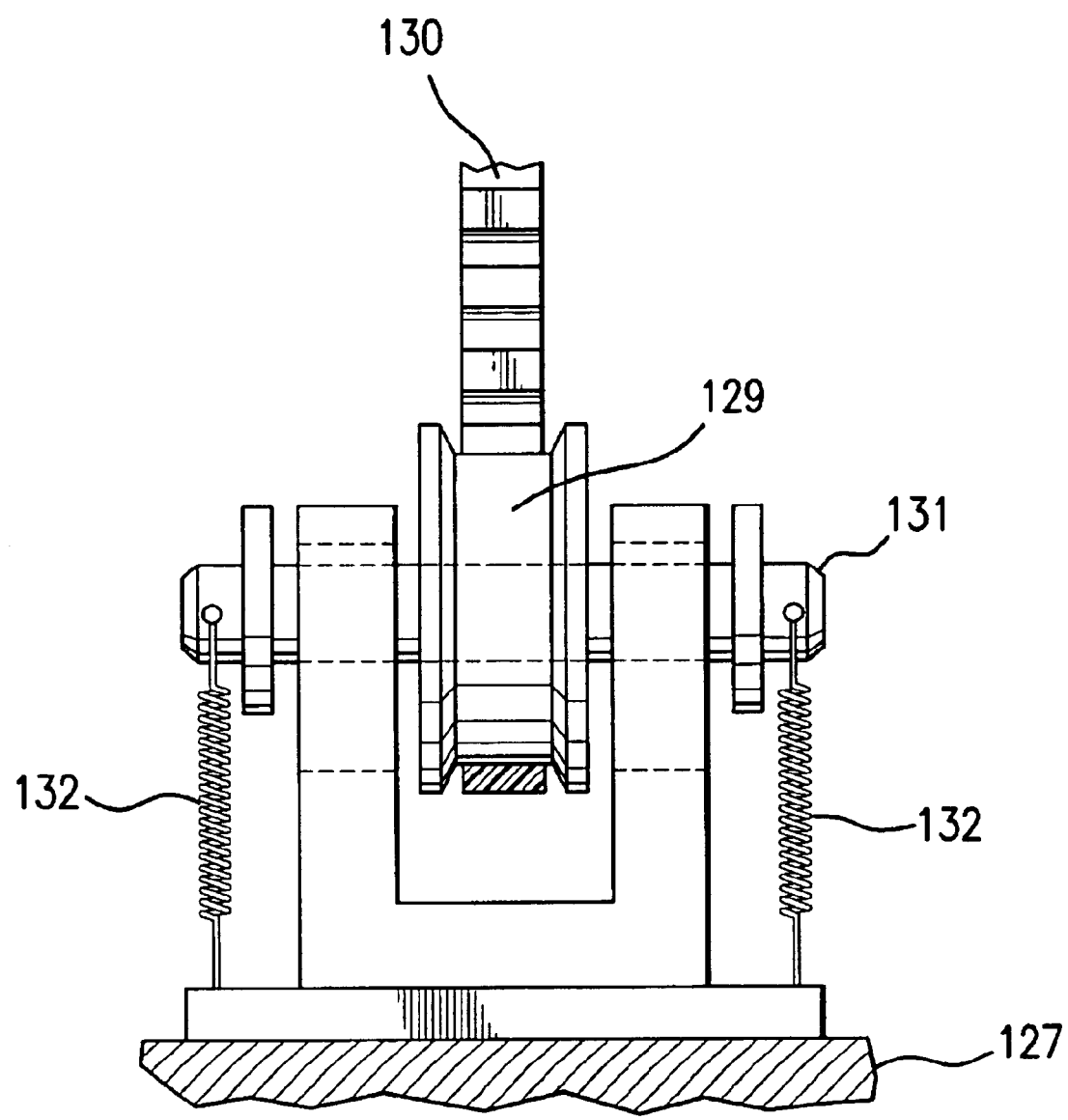
FIG. 7 shows a detailed view of the drive mechanism shown in FIG. 6.

FIG. 7 shows a cross-sectional view of steering roller 129, which is provisioned on axle 131. Force is exerted on the end regions of axle 131 in the direction of body 127 by pulling elements 132. Toothed belt 130, which runs over steering roller 129, is thus kept taut.

LEGEND

Loading apparatus 100
Loading floor 101
Spacing element 102
End region 103
Section 1.04
Vehicle floor 105
Section 106
Distance 107
Face 108
Slant 109

Loading edge 110
Angle 111
Drive mechanism 112
Cord winch 113
Cord 114
Slideball 115
Distance 116
Upper side 117
Arm 118
End region 119
Guide rod 120
End 121
Grip 122
Roller 123
U-profile 124
Shaft 125
Gearwheel 126
Body 127
Drive mechanism 128
Steering roller 129
Toothed belt 130
Axle 131
Pulling element 132

What is claimed is:

1. Loading apparatus for a vehicle with loading floor provisioned in a loading area of the vehicle, wherein the loading floor exhibits a spacing element at a first end region, with guide linkage, wherein the lower end of the spacing element is configured to engage the guide linkage, and with the vehicle having a loading edge, wherein the loading edge exhibits a slant for supporting the loading floor at its second end region, wherein the guide linkage exhibits a first section, which runs parallel to the slant of loading edge, and wherein the guide linkage exhibits a second section, which runs parallel to vehicle floor and thus horizontally, wherein the length of first section is such that as soon as the lower end of the spacing element has reached the end of the first section, the second end region of the loading floor has reached the upper end of the loading edge.

2. Loading apparatus according to claim 1, wherein the spacing element exhibits roll or slide elements on its lower end for engaging the guide linkage.

3. Loading apparatus according to claim 1, wherein the spacing element exhibits drive elements on its lower end.

4. Loading apparatus according to claim 1, wherein a pulling or pushing element is provisioned on the lower end of the spacing element for the transfer of force for extending or retracting the loading floor.

5. Loading apparatus according to claim 4, wherein the pulling element is one of a cord or a cable, which runs along the guide linkage.

6. Loading apparatus according to claim 1, wherein drive mechanism is provisioned on the lower side of the loading floor or underneath the loading edge for extending or retracting the loading floor into or out of a loading area of the vehicle.

7. Loading apparatus according to claim 1, wherein the slant of the loading edge exhibits an angle between from about 25° and about 45°.

8. Loading apparatus according to claim 1, wherein the second end region of the loading floor is slanted to correspond with the slant of the loading edge.

9. Loading apparatus according to claim 1, wherein the slant of the loading edge and the second end region of the loading floor exhibits guide elements.

10. Loading apparatus according to claim 9, wherein the loading edge exhibits a recess in the region of the slant for engaging a guide element provisioned on the second end region of the loading floor.

11. Loading apparatus according to claim 1, wherein the spacing element consists of steering devices provisioned on the sides of the loading floor and which hold shaft, and wherein shaft exhibits drive elements for engaging the guide linkage.

12. Loading apparatus according to claim 11, wherein shaft is configured with toothed belt of V-belt for the transference of drive force.

* * * * *